United States Patent [19]
Hashimoto et al.

[11] Patent Number: 6,112,470
[45] Date of Patent: Sep. 5, 2000

[54] VEHICLE DOOR AND METHOD FOR ASSEMBLING THE SAME

[75] Inventors: Hideyuki Hashimoto, Aichi; Kunio Osanami, Tokyo; Kenichi Ishikawa, Aichi, all of Japan

[73] Assignee: Asahi Glass Company Ltd., Tokyo, Japan

[21] Appl. No.: 09/194,425

[22] PCT Filed: Mar. 31, 1998

[86] PCT No.: PCT/JP98/01479

§ 371 Date: Nov. 30, 1998

§ 102(e) Date: Nov. 30, 1998

[87] PCT Pub. No.: WO98/43841

PCT Pub. Date: Oct. 8, 1998

[30] Foreign Application Priority Data

Apr. 1, 1997 [JP] Japan .................................... 9-082971

[51] Int. Cl.[7] ........................................................ B60J 5/04
[52] U.S. Cl. ............................................................ 49/502
[58] Field of Search ........................ 49/502; 296/146.5, 296/146.7

[56] References Cited

U.S. PATENT DOCUMENTS

| | | | |
|---|---|---|---|
| 4,328,642 | 5/1982 | Presto | 49/502 |
| 4,648,208 | 3/1987 | Baldamus et al. | 49/502 |
| 4,743,062 | 5/1988 | McLaren et al. | |
| 4,785,585 | 11/1988 | Grier et al. | |
| 4,794,735 | 1/1989 | Batchelder et al. | |
| 4,850,636 | 7/1989 | McLaren et al. | |
| 5,355,629 | 10/1994 | Kimura et al. | |
| 5,787,645 | 8/1998 | Heim et al. | 49/502 |
| 5,819,473 | 10/1998 | Hashimoto et al. | |
| 5,822,927 | 10/1998 | Hellenkamp et al. | 49/507 |
| 5,855,094 | 1/1999 | Baudisch et al. | 49/502 |
| 5,867,942 | 2/1999 | Kowalski | 49/502 |
| 5,904,002 | 5/1999 | Emerling et al. | 49/502 |

FOREIGN PATENT DOCUMENTS

| | | |
|---|---|---|
| 0 304 769 | 3/1989 | European Pat. Off. . |
| 0 405 159 | 1/1991 | European Pat. Off. . |
| 38 35 163 | 4/1990 | Germany . |
| 63-53112 | 3/1988 | Japan . |
| 2 250 534 | 6/1992 | United Kingdom . |

*Primary Examiner*—Jerry Redman
*Attorney, Agent, or Firm*—Oblon, Spivak, McClelland, Maier & Neustadt, P.C.

[57] ABSTRACT

An outer panel which includes a panel body and an outer sash and an inner panel which includes a panel base for mounting door equipments, and an inner sash are joined together to form a door panel so as to confront the outer sash and the inner sash to form a sash, and a door trim is attached to the door panel to provide a vehicle door.

3 Claims, 5 Drawing Sheets

VEHICLE DOOR AND METHOD FOR ASSEMBLING THE SAME

TECHNICAL FIELD

The present invention relates to a vehicle door and a method for assembling the same, which can make assembly easily at a body rigging line for vehicles.

BACKGROUND ART

For manufacturing a typical vehicle body, stamped steel plate parts are welded together at a body welding line to prepare several subassemblies, and the subassemblies are assembled to provide a white body. After the white body is painted at a body painting line, equipments are assembled to the painted body at a body rigging line, completing the vehicle body.

A vehicle door to be assembled to a vehicle body is mainly constituted by a door outer panel arranged on an exterior side thereof and a door inner panel arranged on an interior side thereof. Both panels are stamped steal plate parts. The door outer panel and the door inner panel are assembled in a door subassembly by hemming and spot-welding at the body welding line. After the door subassembly is assembled to the body through hinges, painting including electrocoating, intermediate coating and finish coating is applied to the door subassembly at the body painting line. The reason why such painting is carried out with the door subassembly assembled to the body is that the door is prevented from having a different tone of color from the body. Finally, door equipments such as a door widow glass and a window regulator are assembled to the door at the body rigging line.

Figure 5:
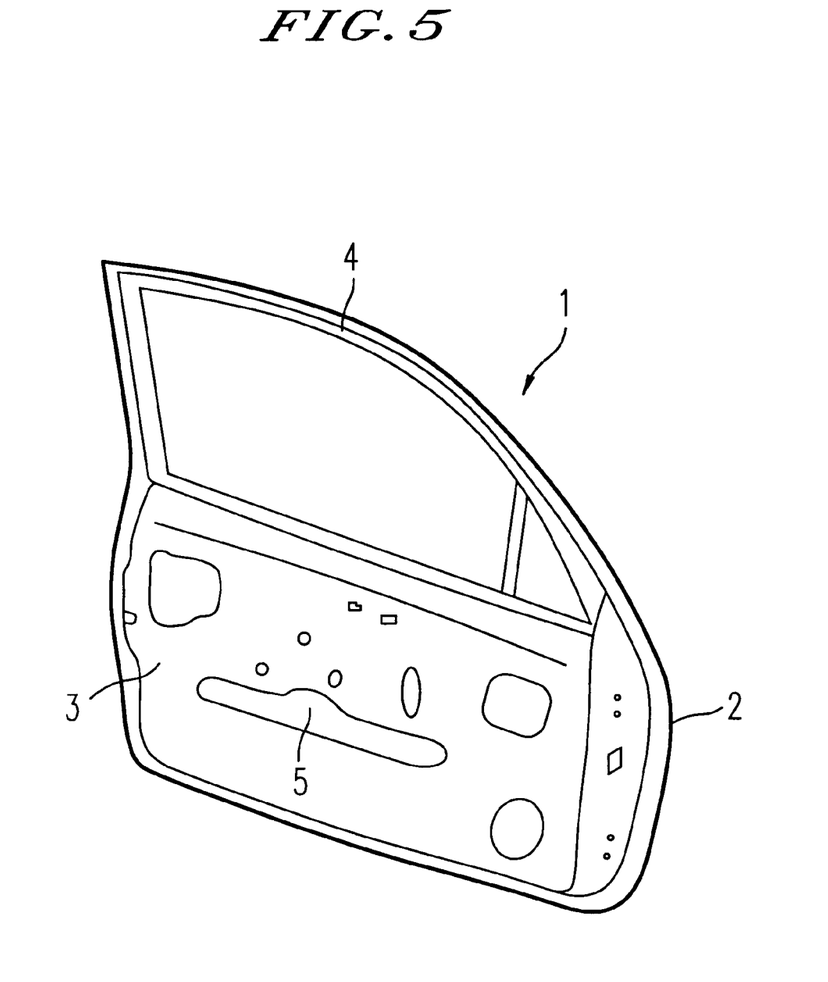
FIG. 5 is a front view showing a conventional vehicle door which is seen from an interior side thereof with a door trim removed therefrom.

With regard to such a vehicle door made of stamped steal plates, attaching the door equipments is carried out in such a situation that the door subassembly assembled to the body has been completely painted i.e. that the door outer panel 2 has the door inner panel 3 attached to an interior side thereof and a sash 4 joined thereto to provide a vehicle door panel 1 as shown in FIG. 5. It is usual that the required door equipments are assembled to the door through an access opening 5 formed in the door inner panel 3.

When the door equipments, in particular, large parts such as the window regulator are assembled to the door through the narrow access opening 5 in the door inner panel 3, it is necessary to carry out assembly into the door, handling such large parts at the body rigging line. This operation has required a lot of time and could damage the completely painted body. The attaching operation of such large parts through the narrow access opening involves complicated steps. It is extremely difficult to automatize the operation even if e.g. an excellent industrial robot is used.

There have been some proposals wherein door equipments are attached to a single plate to provide a module and the module is attached to a door panel. These proposal can eliminate the complication caused by attachment of the respective door equipments through the access opening in a door inner panel.

For Example, U.S. Pat. No. 4,785,585 has proposed that door equipments be integrally formed with a module plate to provide a door module and the door module is attached to a door panel. In this proposal, the door inner panel has an opening formed therein, and the door module is inserted into the door panel through the opening in the door inner panel, improving ease in door attachment.

In the door disclosed in the U.S. patent, a cavity is provided between the inner panel and an outer panel and the door module is mounted in the cavity. Since the opening is formed in the inner panel as stated, the door module can be inserted into the cavity through the opening to be mounted in the cavity. The door module is attached in the cavity by lifting the door module from a lower end toward an upper end of the opening to insert a door window glass into a belt line formed between the inner panel and the outer panel as shown in the drawings of the U.S. patent.

In order to handle the door module for inserting it into the opening in the operation for inserting and attaching of the door module, two-dimensional movement or three-dimensional movement in some instances is required. Specifically, the door module is moved in a direction perpendicular to a surface of the opening (a direction for advancing the door module toward the opening: a first direction) and a direction in parallel with the surface of the opening (a direction from the lower end of the opening toward the belt line: a second direction) until the door module has been mounted into the cavity. The movement of the door module in the vicinity of the opening is one that is at least a combination of the movement in the first direction and that in the second direction.

Such movement of the door module is a bar to automatize the manufacture of vehicles including doors. Rapid and simple assembly of doors by a robot in an assemble line for vehicles can significantly contribute to automation of the manufacture of the vehicles. However, the movement which is constituted by combined movement in a plurality of directions is complicated. It is not easy to carry out attachment of such a door module into the cavity by use of a robot.

In the door disclosed in the U.S. patent, the door module as a whole becomes a large part due to the integration of the door equipments thereto. For this reason, it is necessary to cope with the problem as stated, which is inherent to the large part in handling the large part for attachment, and which is not created when the door equipments are independently mounted as usual. Since the door according to the U.S. patent is proposed without considering the problem due to an increase of the part size, it is not possible to improve the assembling operation for the door though the door equipments are integrally formed with the module plate.

On the other hand, it is usual that the vehicle door has e.g. a door lock attached thereto. Since the door lock projects toward the vehicle body, the door lock is attached to a rear end of the door inner panel so as to provide a projection. This means that if the door lock is integrally formed with the door module, the three-dimensional movement as stated earlier is required. If attachment of the door lock is carried out after the door module has been mounted to the door panel, it is not possible to contribute to simplification in the operation.

In order to cope with this problem, a structure wherein the door module is inserted from a front end with respect to the door panel is appropriate. Such structure has been disclosed in e.g. U.S. Pat. No. 4,850,636. However, this structure has required that hinges for opening and closing the door be attached to the door module. This creates a problem in that the attaching arrangement for the hinges which plays an important role for opening and closing the door can not ensure sufficient strength. If e.g. attaching position of the hinges is adjusted to solve this problem, mounting adjustment between the contour of the door itself and a door opening in the vehicle body becomes difficult.

In order to cope with this problem, it has been proposed that the door outer panel is formed from a synthetic resin and the door equipments are mounted to a skeleton sandwiched between the door outer panel and the door inner panel to improve the door assembling operation (see e.g. JP-A-6353112).

In the vehicle door disclosed in the publication, the skeleton has a window glass sash, and the skeleton is mounted to a body through hinges, functioning as the main portion of the door. Since the door inner panel and the door outer panel work as only covers for covering the interior side and the exterior side of the skeleton, there is created a problem in that the operation for handling the door equipments in attaching the door equipment the skeleton degrades.

If a fault in the door equipment is found after the skeleton has been attached to the body (irrespectively of prior to and after completion of the vehicle), or if maintenance of the door equipments is carried out in the future, it is difficult to carry out repairing operation without additional operation since the door equipments have already been mounted to the skeleton. In such a case, if the skeleton itself is removed from the body, poor handling of the skeleton makes the repairing operation for the door equipments difficult because the skeleton functions as the main portion of the door.

Since the skeleton functions the main portion of the door with the door window glass sash as explained, each type of car necessarily requires preparation of a skeleton suited to the shape of the car. It is difficult to cope with users' car demand which requires a variety of sizes in small run as a recent significant trend, production control is complicated. Since the attachment of the outer panel is carried out after the skeleton has been attached to the body, painting must be carried out with the door equipments assembled to the skeleton in order to match the outer panel with the body in terms of a tone of color. This means that door equipment are exposed to a paint.

It is an object to the present invention to eliminate the problem of the prior art and to provide a vehicle door and a method for assembling the same capable of improving the assembling operation for door equipment.

DISCLOSURE OF THE INVENTION

The present invention to attain this object is characterized in that a vehicle door comprises a door panel having a sash integrally attached thereto; and a door trim covering an interior side of the door panel; wherein the door panel includes an inner panel with door equipments attached thereto and an outer panel, which are assembled together in alignment with each other so as to be confronted so that a space is provided to house the door equipments between a panel body of the outer panel and a panel base of the inner panel, the sash is divided in two halved sash parts which are an outer sash integrally attached to the outer panel at a portion thereof above the panel body and an inner sash integrally attached to the inner panel at a portion thereof above the panel base, and the outer panel and the inner panel are joined so as to make the two halved sash parts confronted with each other, providing the sash.

The present invention to attain this object is also characterized in that a method for assembling a vehicle door wherein an outer panel and an inner panel are joined together to assemble a door panel comprises preparing an outer panel which has a panel body forming an outer surface of a vehicle and an outer sash integrally attached to the panel body at a portion thereabove, and which provides a space to house door equipments therein between an inner panel and the outer panel when joined to the inner panel; preparing the inner panel which has a panel base for mounting the door equipments thereto and an inner sash integrally attached to the panel base at a position thereabove, and which has the door equipments mounted to the panel base; and confronting the outer panel and the inner panel and assembling the outer panel and the inner panel in alignment with each other to confront the inner sash and the outer sash so as to provide a sash, thereby assembling a vehicle door with the sash at an upper portion thereof.

In a preferred mode of the present invention, at least one alignment pin which is formed at a predetermined portion on one of the outer panel and the inner panel, and at least one alignment hole which is formed at a corresponding position on the other one of the outer panel and the inner panel are combined so that the outer panel and the inner panel can be automatically aligned with each other. It is preferable that the outer panel has a weatherstrip attached thereto at a sealing position including an outer peripheral side of a halved sash part. In addition, it is preferable that the door equipments include a door window glass, a regulator for raising and lowering the door window glass and a run channel for guiding the door window glass along the sash, the inner sash has a recessed portion for housing the run channel, the outer sash has an outer surface covering an exterior side of the inner sash and a receiving portion contacting with an outer bottom side of the recessed portion so as to receive the outer bottom side of the recessed portion.

BEST MODE FOR CARRYING OUT THE INVENTION

Figure 1:
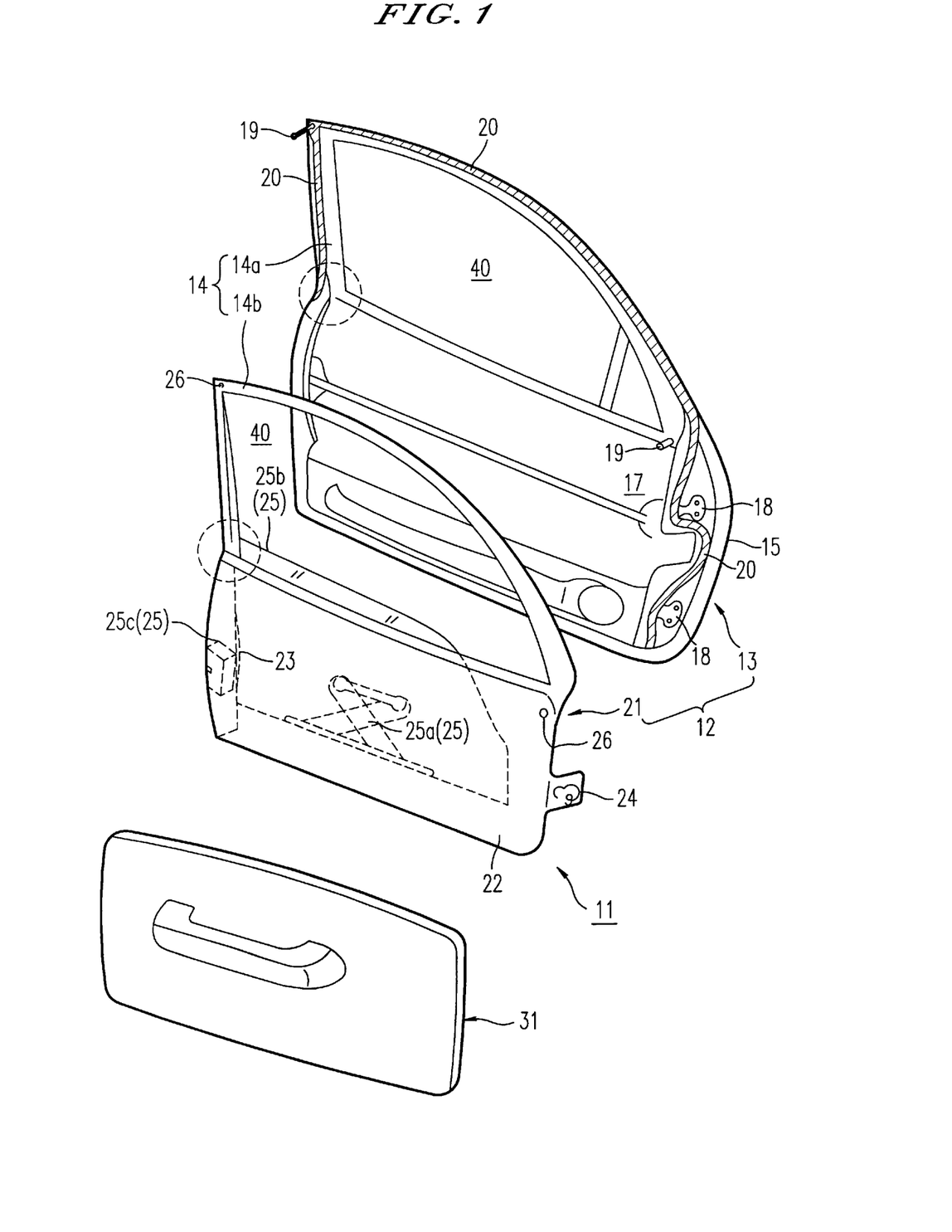
FIG. 1 is an exploded perspective view showing an example of the vehicle door according to the present invention.

In FIG. 1 is shown an exploded perspective view of an example of the vehicle door according to the present invention, wherein a vehicle door 11 is constituted by a door panel 12 with a sash 14 integrally formed thereto and a door trim 31 covering an interior side of the door panel 12. The sash 14 surrounds a door window 40.

In the example shown, the door panel 12 comprises an outer panel 13 including a panel body 15 below the door window 40 and an outer sash 14a, and an inner panel 21 including a panel base 22 below the door for mounting required door equipments 25 thereto and an inner sash 14b. The panel body 15 of the outer panel 13 is formed in a dish-like shape so as to provide a recess on an interior side thereof. The inner panel 21 and the outer panel 13 are joined together to provide a space 17 which houses the door equipments 25 mounted to an exterior side of the panel base 22.

The panel body 15 forming the outer panel 13 provides an outer surface of the door. The panel body as a whole is formed by stamping it along with the outer sash 14a from a steal plate.

The outer panel 13 has a weatherstrip 20 preattached thereto at a certain sealing position including an outer peripheral side of the outer sash 14a and the panel body 15. The weatherstrip 20 is provided substantially along and on the exterior side to a boundary (dividing line) which is formed between the inner panel 21 and the outer panel 13 when both panels are joined together. The weatherstrip can ensure watertightness for the door.

A door lock 25c including a latch and a checker 24 for adjusting the opening and closing operation of the door among the door equipments 25 are usually provided at a substantially central position on the respective ends of the door. Considering the provision of the door lock and the checker, it is preferable that the dividing line is not linear but includes curved portions as shown. The shape of the inner panel 21 and that of the outer panel 13 are appropriately determined so that the inner panel and the outer panel can be closely jointed together so as to be adopted to the shapes of the door equipments 25 and other parts mounted to the inner panel 21. In this example, hinge assembling portions 18 for opening and closing the door are provided on the outer panel 13. This arrangement can ensure rigidity for the opening and closing operation of the door and firmly mount the door to the body.

On the other hand, the panel base 22 forming the inner panel 21 is prepared to mount the door equipments 25 thereto under the conditions that the panel base is arranged so as to relatively correspond to the position of the space 17 provided by the panel body 15. The panel base is stamped along with the inner sash 14b from a steal plate so as to have a contour substantially conformed to that of the outer panel 13.

The door equipment 25 to be mounted to the panel base 22 are constituted by a regulator 25a, a door window glass 25b supported by the regulator 25a so as to vertically moved along the inner sash 14b, the door lock 25c attached to a rear bent portion 23 formed by bending, toward the exterior side, a rear end of the panel base opposite to the end with the panel base coupled to the vehicle body, and the run channel for guiding the vertical movement of the door window glass, as well as a group of parts appropriately needed to meet the requirements of the type of each car. The end with the panel base 22 coupled to the vehicle body has the checker 24 provided thereon.

Either one of the outer panel 13 and the inner panel 21, the outer panel 13 in the shown example, has e.g. two alignment pins 19 provided thereon, and the other, the inner panel 21 in the shown example, has e.g. totally two alignment holes 26 formed therein at corresponding positions.

By inserting the alignment pins 19 into the corresponding alignment holes 26, the outer panel 13 and the inner panel 21 as well as the outer sash 14a and the inner sash 14b can be assembled in alignment with one another so as to be confronted one another. Such fabrication can provide the door panel 12 which has the door equipments 25 housed in the space 17 and includes the sash 14 with the watertightness given by the weatherstrip 20.

The dividing line which appears between the outer panel 13 and the inner panel 21 after assembly is preferably concealed by the door trim 31 which is attached to the interior side of the door panel 12 and has a suitable structure. The vehicle door 11 can be provided so that wind and rain which may come into the dividing line from the exterior side can be shut out by the weatherstrip 20 in a reliable way.

Figure 2:
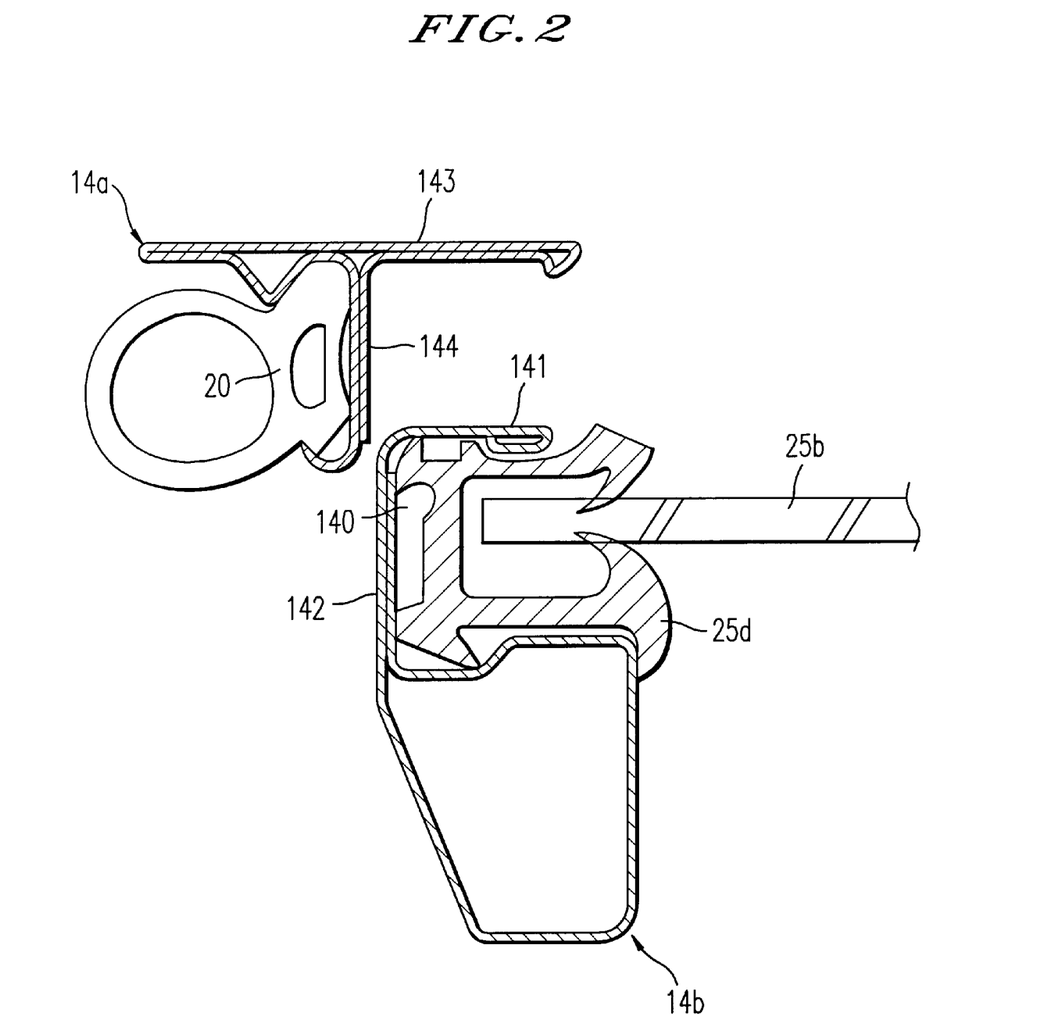
FIG. 2 is an enlarged sectional view of the essential positions surrounded by dotted circles in FIG. 1.
Figure 3:
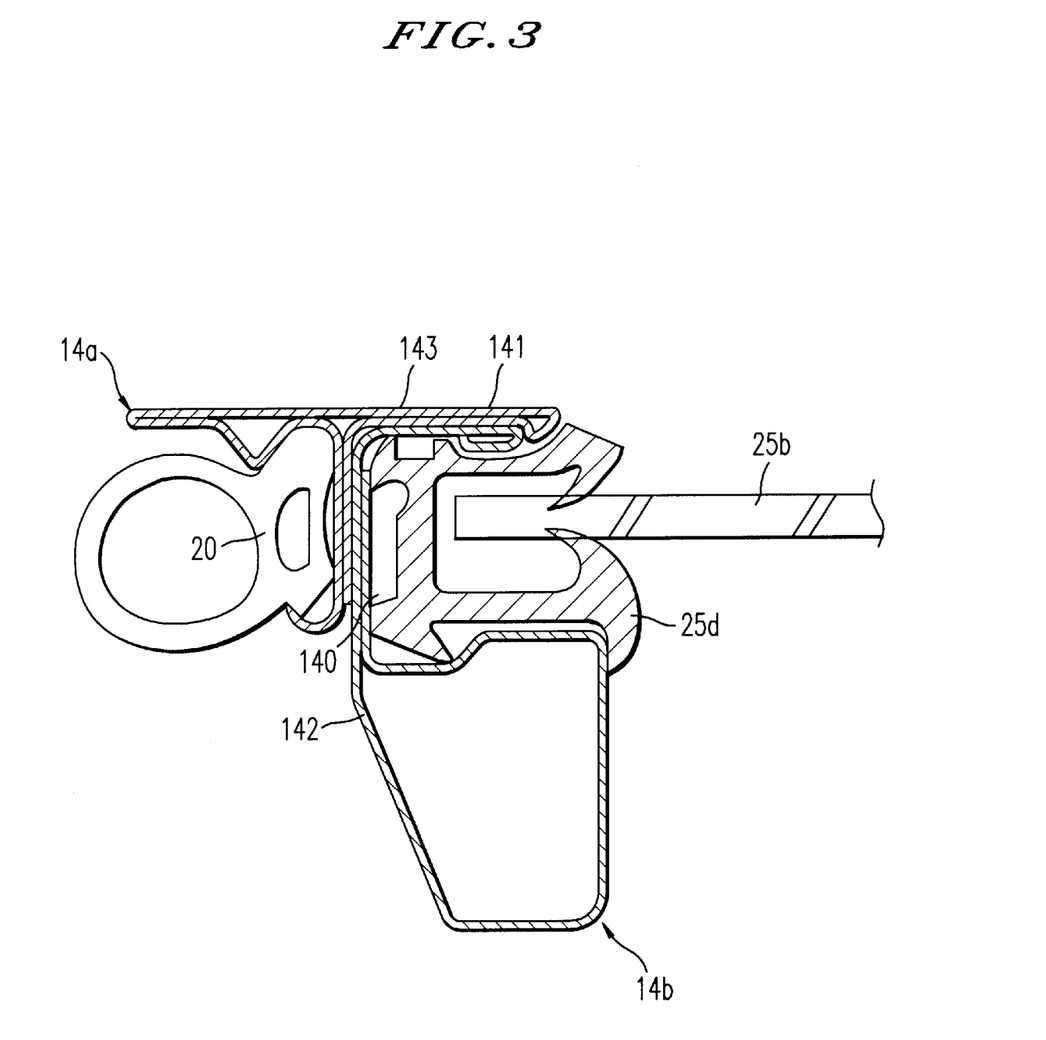
FIG. 3 is an enlarged sectional view showing the manner in which the inner sash and the outer sash shown in FIG. 2 are assembled together.

In FIG. 2 is shown an exploded sectional view of essential portions to explain the structure of the sash of the vehicle door according to the present invention, which is divided in two parts, and wherein the portion surrounded by dotted circles in FIG. 1 is enlarged. In FIG. 3 is shown a sectional view of the essential portions illustrating the manner in which the essential portions are assembled.

The inner sash 14b includes a recessed portion 140 to house the run channel 25d made of flexible plastic. The run channel 25d is housed in the recessed portion 140 to guide the door window glass 25b when the door window glass 25b is lowered and raised. The outer sash 14a is formed substantially in a T-character shape in section so that the outer sash 14a includes an outer surface 143 covering an exterior side 141 of the inner sash 14b and a receiving portion 144 contacting with an outer bottom side 142 of the recessed portion 140 so as to receive the outer bottom side 142. The receiving portion 144 has an outer peripheral side provided with the weatherstrip 20.

The door equipments 25 including the run channel 25d can be collected in the inner panel by forming the inner sash 14b so as to have the recessed portion 140 formed therein to house the run channel 25d as explained. The provision of the recessed portion 140 in the inner sash 14b can give sufficient rigidity required to the sash.

Now, a method for assembling the vehicle door 11 according to the present invention and advantages offered by the method will be described.

Since the door panel 12 is constituted by two divided members of the outer panel 13 and the inner panel 21, the outer panel and the inner panel can be independently assembled in different manufacturing processes.

The panel body 15 of the outer panel 13, which provides the door with the outer surface, is formed in a dish-like shape to provide the space 17 to house the door equipments 25. The panel body 15 can be simply formed by stamping it along with the outer sash 14a from a steel plate. The required space 17 can be easily formed at a appropriate position which is determined in relation to the arrangement of the door equipments 25 attached to the inner panel 21. The weatherstrip 20 is provided at a certain sealing position including the interior side of the outer sash 14a and the panel body 15, ensuring required watertightness in a sufficient way.

On the other hand, the inner panel 21 is constituted by the panel base 22 formed by being stamped along with the inner sash 14b from a steel plate, and the door equipments 25 attached to the panel base 22. Such arrangement allows the respective door equipments 25 to be automatically assembled by using e.g. an industrial robot with good precision in an independent manufacturing process without damaging a completely painted body by a jig used to the panel base 22.

Since the inner panel 21 is concealed by the outer panel 13 and the door trim 31, the color painted on the inner panel is not relevant to that painted on an outer surface of the vehicle body. In order to match the tone of color of the outer panel 13 to that of the body, the inner panel 21 does not have to be assembled to the outer panel 13 before the outer panel is painted assembled to the body. The attachment of the door equipments 25 can be carried out being completely independent of the painting process. The inner panel 21 with the door equipments 25 mounted thereto can be assembled to the outer panel 13 after body painting has been made with the outer panel 13 assembled to the body.

The door window glass 25b among the door equipments 25 attached to the panel base 22 is attached to the panel base so as to be able to be raised and lowered along the inner sash 14*b* (in the run channel thereon). By such arrangement, the lifting test for the door window glass 25*b* and its required adjustment can be easily carried out only on the inner panel 21 before the inner panel 21 is joined to the outer panel 13.

The outer panel 13 has the alignment pins 19 provided thereon, and the inner panel 21 has the alignment holes 26 formed therein. By inserting the alignment pins 19 into the alignment holes 26, the outer panel 13 and the inner panel 21 as well as the outer sash 14*a* and the inner sash 14*b* can be instantly assembled in alignment with one another so as to be confronted one another.

The inner panel 21 can be assembled to the outer panel 13 as explained to provide the door panel 12 which has the door equipments 25 housed in the space 17 and includes the sash 14 having superior watertightness.

Since the vehicle door 11 is constituted by three-divided independent members of the outer panel 13, the inner panel 21 and the door trim 31 which can be easily handled, painting can be carried out to the body with only the outer panel 13 attached thereto, and the inner panel 21 with the door equipments 25 mounted thereto can be coupled to the outer panel 13 with easy handling after painting to provide the door panel 12. Since the door panel 12 can be assembled by attaching the door trim 31 thereto after coupling the door panel 12 to the body, the assembling time required in the body rigging line can be significantly shortened.

By forming the inner sash 14*b* so as to have the recessed portion 140 formed therein to house the run channel 25*d*, the door equipments 25 including the run channel 25*d* can be collected in the inner panel, making the lifting test and so on easy. Since the inner sash 14*b* is formed to have the recessed portion 140 formed therein, the vehicle door can be provided by simple assembling operation without lowering the rigidity required to the sash.

Although the explanation has been made with respect to the single example in order to understand the vehicle door according to the present invention easily, the scope of the present invention is not limited to the single example. For example, the material, the shapes and the structures of the outer panel and the inner panel may be appropriately modified in accordance with the specifications of a vehicle door according to the present invention.

The panel body and the outer sash may be independently shaped and joined together by e.g. welding, instead of being stamped together. Likewise, the panel base and the inner sash may be independently shaped and joined together by e.g. welding instead of being stamped together.

Figure 4:
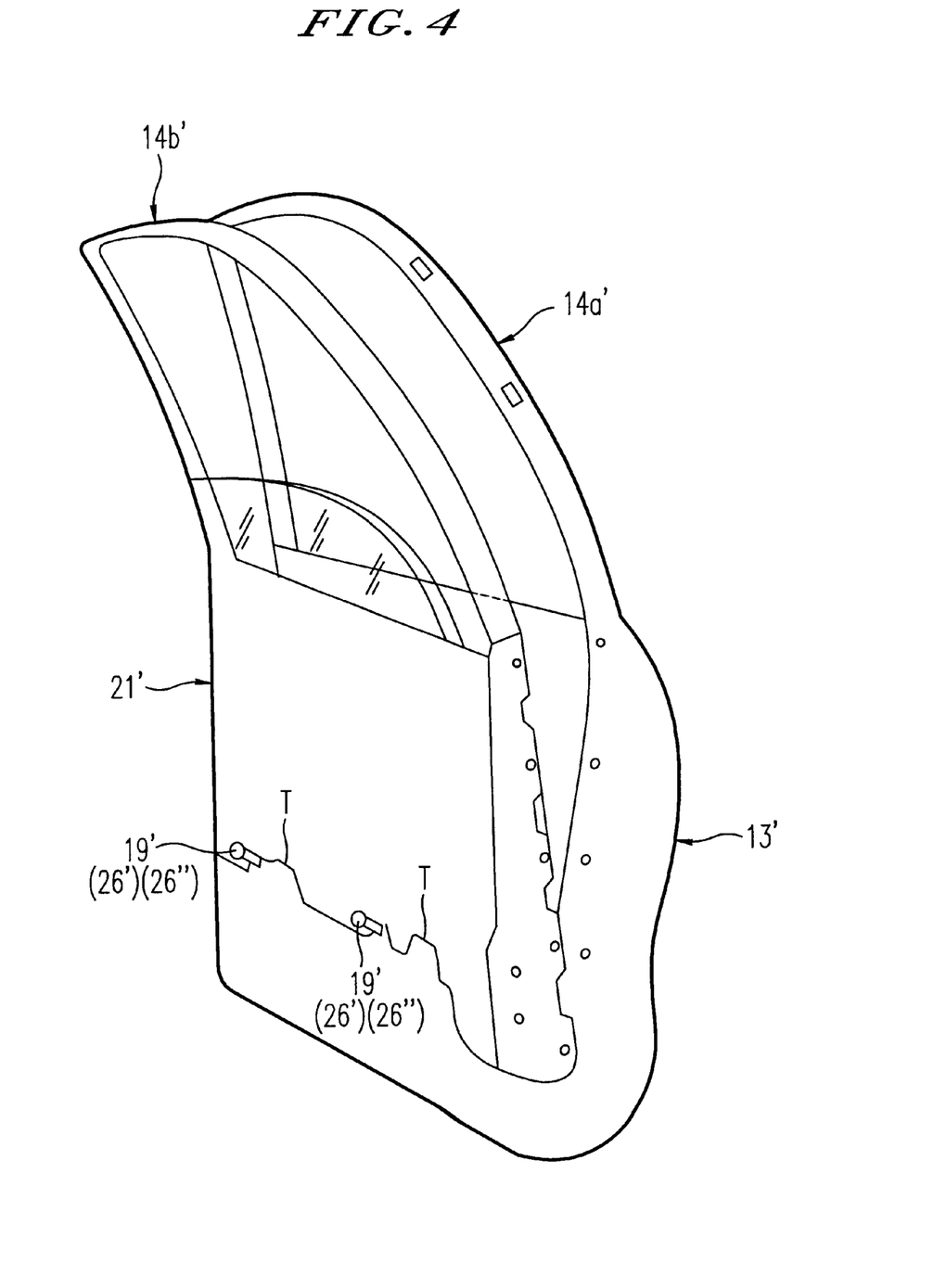
FIG. 4 is a partly exploded perspective view showing another example of the vehicle door according to the present invention.

Although the vehicle door according to the present invention is formed so that the outer panel and the inner panel are assembled so as to be confronted each other, both panels are not necessarily required to have the same size in contour. As shown in FIG. 4, the outer panel 13' has substantially the same contour as the inner panel 21' in a longitudinal direction of the vehicle and the inner panel 21' has a smaller size than the outer panel 13' in a vertical direction of the vehicle, for instance. However, the outer sash 14*a*' of the outer panel 13' has substantially the same contour as the inner sash 14*b*' of the inner panel 21' even in the example of FIG. 4.

In this case, the assembling reference in the vertical direction with respect to the outer panel 13' and the inner panel 21' is controlled by a line T. The alignment pins 19' are inserted into alignment holes 26' formed in the outer panel 13' at positiones near to the line T and in the alignment holes 26" formed in the inner panel 21', assembling both panels in alignment with each other in the longitudinal direction so as to be confronted together. After that, mounting holes which are formed in the end surfaces of both panels shown in FIG. 4 are used to complete assembly by e.g. bolting. Such confronting manner is also included in the assembling manner for the vehicle door according to the present invention.

INDUSTRIAL APPLICABILITY

In accordance with the present invention, the inner panel which includes the inner sash and has the door equipments mounted thereto is post-assembled to the outer panel constituted by the panel body and the outer sash, realizing easy assembly of a door panel with the door equipments mounted thereto without using an access hole with bad operating performance. The assembling operation does not need two-dimensional or three-dimensional complicated movement, making the operation simple. Since the inner panel is provided so that the required door equipments are preattached to the panel base, the inner panel is easy to handle.

As a result, the time required for assembling a door can be shortened to increase the producibility at the body rigging line. The easy operation can prevent a body from being damaged, and can realize automation by e.g. an industrial robot easily.

Since the outer panel and the inner panel are separate members, inspection, repair and exchange of equipments such as a door window glass and a regulator can be easily carried out for maintenance of a perfected car. In the maintenance, the inspection, the repair and the exchange can be carried out more simply since the inner panel is easy to handle.

When either one of the outer panel and the inner panel has an alignment pin provided thereon while the other one has an alignment hole formed therein, the alignment pin and the alignment hole are used to carry out alignment to instantly and properly assemble both panels so as to confront both panels including the outer sash and the inner sash one another.

The vehicle door can be provided in such a manner that the dividing line which is provided between the outer panel and the inner panel after assembling can be concealed by the door trim attached to the interior side of the door panel, and wind or rain which may come into the dividing line from the exterior side can be shut out by provision of the weatherstrip in a reliable way.

In addition, the inner sash can be formed so as to have the recessed portion to house the window glass run channel, collecting the door equipments including the glass window run channel in the inner panel. The provision of the recessed portion in the inner sash can provide a vehicle door with simple assembling operation without lowering the rigidity required to the sash.

What is claimed is:

1. A vehicle door comprising:

a door panel having a sash integrally attached thereto, the sash surrounding a door windows; and a door trim covering an interior side of the door panel;

wherein the door panel includes an inner panel with door equipments attached thereto and an outer panel, which are assembled together in alignment with each other so as to be confronted so that a space is provided to house the door equipments between a panel body of the outer panel below the door window and a panel base of the inner panel below the door window, the sash is divided in two halved sash parts which are an outer sash integrally attached to the outer panel at a portion thereof above the panel body and an inner sash integrally attached to the inner panel at a portion thereof above the panel base, and the outer panel and the inner panel are joined so as to make the two halved sash parts confronted with each other, providing the sash, and wherein one ot the outer sash and the inner sash has at least one alignment pin formed thereon at a predetermined position thereof and another has at least one alignment hole formed therein at a corresponding position thereof so that the outer panel and the inner panel can be automatically aligned with each other.

2. The vehicle door according to claim 1, wherein the outer panel has a weatherstrip attached thereto at a sealing position including an outer peripheral side of the outer sash.

3. The vehicle door according to any one of claims 1 or 2, wherein the door equipments include a door window glass, a regulator for raising and lowering the door window glass and a run channel for guiding the door window glass along the sash, the inner sash has a recessed portion for housing the run channel, the outer sash has an outer surface covering an exterior side of the inner sash and a receiving portion contacting with an outer bottom side of the recessed portion so as to receive the outer bottom side of the recessed portion.

* * * * *